US007762143B2

(12) United States Patent
Tamate

(10) Patent No.: US 7,762,143 B2
(45) Date of Patent: Jul. 27, 2010

(54) PENETRATION-TYPE PIPE STRAIN GAUGE

(75) Inventor: Satoshi Tamate, Kiyose (JP)

(73) Assignee: Health Science Technology Transfer Center, Japan Health Sciences Foundation, Chuo-ku (JP)

( * ) Notice: Subject to any disclaimer, the term of this patent is extended or adjusted under 35 U.S.C. 154(b) by 0 days.

(21) Appl. No.: 12/218,877

(22) Filed: Jul. 17, 2008

(65) Prior Publication Data
US 2008/0276716 A1 Nov. 13, 2008

(51) Int. Cl.
G01N 33/24 (2006.01)
(52) U.S. Cl. .................................. 73/784; 73/84
(58) Field of Classification Search ............. 73/84, 73/784
See application file for complete search history.

(56) References Cited

U.S. PATENT DOCUMENTS

| 3,375,885 | A | * | 4/1968 | Scott et al. ................. 175/26 |
| 3,832,861 | A | * | 9/1974 | Jahnke et al. ............. 52/127.5 |
| 4,091,661 | A | * | 5/1978 | Handy et al. ................. 73/784 |
| 4,382,384 | A | * | 5/1983 | Mitchell et al. .............. 73/594 |
| 4,649,741 | A | * | 3/1987 | Strom ......................... 73/84 |
| 5,265,466 | A | * | 11/1993 | Richter et al. ................ 73/85 |
| 5,319,959 | A | * | 6/1994 | Cooper et al. ................ 73/84 |
| 5,616,833 | A | * | 4/1997 | Andersson .................... 73/84 |
| 6,062,090 | A | * | 5/2000 | Bachhuber et al. ............ 73/784 |
| 7,201,060 | B2 | * | 4/2007 | Frost et al. .................. 73/784 |
| 7,234,362 | B2 | * | 6/2007 | Shinn et al. ................. 73/784 |
| 7,311,011 | B2 | * | 12/2007 | Clark et al. ............... 73/864.74 |
| 2006/0107772 | A1 | * | 5/2006 | Shinn et al. ............... 73/864.43 |

FOREIGN PATENT DOCUMENTS

| JP | S27-2438 | 3/1952 |
| JP | S44-23551 | 10/1969 |
| JP | S48-38605 | 5/1973 |
| JP | S50-16593 | 5/1975 |
| JP | S53-110236 | 9/1978 |
| JP | 63-151819 | 6/1988 |
| JP | H03-50624 | 5/1991 |
| JP | 2514095 | 7/1996 |
| JP | 11-280028 | 10/1999 |
| JP | 2000-001850 | 1/2000 |

* cited by examiner

Primary Examiner—Lisa M Caputo
Assistant Examiner—Freddie Kirkland, III
(74) Attorney, Agent, or Firm—Masuvalley & Partners

(57) ABSTRACT

A penetration-type pipe strain gauge easily transportable and easily installable in various places at low cost in a short period of time to measure strain produced in a shallow layer of the ground. Strain gauges are attached to the outer peripheral surface of an inner pipe, and a pipe strain gauge body is formed by integrally incorporating the inner pipe in an outer pipe. A boring screw is provided at the forward end of the pipe strain gauge body. A rotary tool mounting part for mounting a tool for rotating the pipe strain gauge body is formed at the rear end of the strain gauge body. The pipe strain gauge body is buried in the shallow layer of the ground by using the rotary tool.

3 Claims, 10 Drawing Sheets

FIG 4
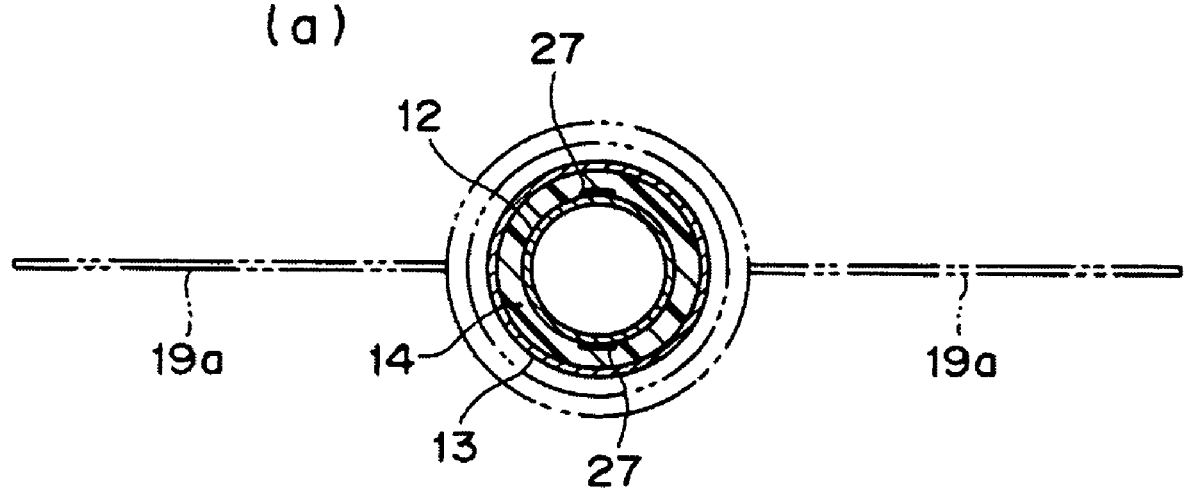
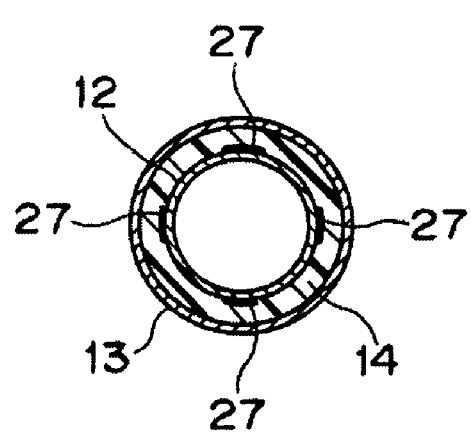

PENETRATION-TYPE PIPE STRAIN GAUGE

TECHNICAL FIELD

This invention relates to an art of detecting a ground strain caused by a land slide on a slope or caused by a collapse of subsurface ground or mudflow after a heavy rain by means of strain gauges mounted inside the body of a penetrated tubular strainmeter in the ground and evaluating the ground strains by a measuring instrument on the ground, and more particularly, to a penetration-type tubular strainmeter for detecting a ground strain developed in a shallow ground layer.

BACKGROUND ART

A conventional tubular strainmeter is disclosed in, for example, the patent document 1 cited below. The conventional tubular strainmeter is laid deeply in the ground of a hazardous area, as shown in FIG. 11, to detect and measure strains developed in tubes by means of internal strain gauges installed in the tubes, and to confirm the position of a landslide and to assess the landslide.

The conventional tubular strainmeter is installed as follows. First, an installation hole is pre-bored for the tubular strainmeter with a boring machine to a depth in the range from 20 to 30 m. Next, a strain gauge 5 is stuck on the outer peripheral surface of each steel tube (1a, 1b, 1c, . . . ). Each gauge is covered with a protective material. These steel tubes are connected together by fitting one end of a tube into another end of another tube using a joint tube 2 and fastening the joint tube 2 with a rivet 3, thereby forming a measuring tube 1, which is then inserted into the installation hole. Finally, cement milk is poured into the installation hole to fill the space in the hole and firmly fix the tube in the ground to improve the detection accuracy of the tubular strainmeter.

Patent document 1: Japanese Utility Model Registration No. 2514095.

PROBLEMS TO BE SOLVED BY THE INVENTION

Installation of a conventional tubular strainmeter requires a considerable amount of labor. First, it is not easy to carry the measurement tube 1, since it consists of many steel tubes and has a length of more than 20 m.

Second, installation of the strainmeter requires two separate works, one for pre-boring an installation hole that exceeds 20 m with a boring machine, and another for setting up a measurement tube 1 in the ground. In addition, each of the strain gauges 5 stuck on the steel tube must be covered with a protective material 6 to prevent it from being peeled off during installation when it comes into contact with the wall of the installation hole. Further, the measurement tube 1 must be assembled from many tubes. Additionally, injection of cement milk into the installation hole is necessary after the strainmeter is placed in the installation hole to improve the detection accuracy of the strainmeter. Thus, installation of a conventional tubular strainmeter requires tremendous amounts of time, labor, and cost preventing the strainmeter from easy installation.

Conventional tubular strainmeters are buried deep in the ground to detect positions of landslides. It should be noted, however, that a ground strain develops in a shallow ground layer of a slope prior to the landslide, that is, there can be a premonitory phenomenon indicative of the landslide. Therefore, it is possible to make an assessment of time and degree of a possible landslide based on the premonitory ground strain detected in the shallow ground layer say, provided that it is accurately measured and evaluated.

SUMMARY OF THE INVENTION

In view of the prior art problems as mentioned above, the present invention seeks to provide an improved penetration-type tubular strainmeter that can be easily carried to various sites by a person to measure a ground strain in a shallow ground layer and conveniently installed in the ground in a short period of time with much less work and cost.

Means for Solving the Problem

To this end, there is provided in accordance with one aspect of the invention, a tubular strainmeter for measuring a ground strain by means of strain gauges mounted on a tubular member penetrated in the ground, the tubular strainmeter comprising:

a body having a double-tube structure that includes an inner tube housed in an outer tube, the inner tube mounted, on the outer surface thereof, with a multiplicity of strain gauges;

a drilling screw mounted on the leading end of the body of the strainmeter; and a tool mount provided at the rear end of the body for attaching thereto a tool for rotating the body.

The tubular strainmeter has a total length shorter than the shoulder height of an average adult.

(Function)

The tubular strainmeter has the following functions: (a) it can be compact in size and lightweight, since it has a total length shorter than the shoulder height of an average adult; (b) It can be installed in the ground without using a large-scale boring machine, since its total length is short. (c) The tubular strainmeter is self-equipped with a drilling screw at its leading end, and can be coupled at its rear end with a tool for rotating the tubular strainmeter, thereby boring an installation hole and installation of the strainmeter in the hole can be done simultaneously. (d) The strain gauges will not be peeled off by the ground during installation if they are not covered with protective materials, since they are attached to the inner tube of a double-tube system and covered with the outer tube. (e) There is no need of assembling many steel tubes to form the tubular strainmeter, since the tubular strainmeter has a compact size. (f) The soil removed radially outwardly by the drilling screw during penetration of the strainmeter will be pushed back radially inwardly by the ground pressure to fill the gap between the tubular strainmeter and the ground.

The drilling screw is firmly fixed in the ground after the strainmeter is penetrated. Thus, the tubular strainmeter is firmly fixed in a shallow ground layer without filling the installation hole with cement milk.

In addition, the penetration-type tubular strainmeter may be provided at the rear end portion of the body with a multiplicity of radially extending pressure receiving plates that are spaced apart at equal circumferential intervals.

(Function)

As the pressure receiving plates are penetrated in the ground, the rear end portion of the tubular strainmeter is firmly fixed in the ground. Moreover, the movement of nearby sediment results in an earth pressure acting on the fixed pressure receiving plates, which is properly coupled to the rear end portion of the strainmeter.

In the penetration-type tubular strainmeter defined herein, the tips of the pressure receiving plates may be acutely angled.

(Function)

Being acutely angled, the tips of the pressure receiving plates can cut into the ground, thereby facilitating burial of the whole pressure receiving plates in the ground.

The penetration-type tubular strainmeter defined herein may be provided with an aforementioned rotating tool in the form of a portable electric rotating tool.

(Function)

The portable electric rotating tool provides readiness and convenience to the penetration and installation of the tubular strainmeter.

The results of the invention may be summarized as follows.

Particularly, the invention provides a tubular strainmeter having the following features.

(a) The tubular strainmeter is so compact and lightweight that it can be easily carried by a human to a desired installation site. (b) It can be installed in a short period of time with a reduced cost and labor, since its installation is easy, requiring only a little work. (c) The tubular strainmeter can accurately measure strain in a shallow ground layer, since it can be firmly fixed in the shallow ground layer.

By providing the strainmeter with pressure receiving plates, strain in a shallow ground layer can be accurately detected.

With the tips of the pressure receiving plates being sharply angled, the pressure receiving plates can be entirely penetrated in the ground easily by pushing them with a foot or by striking them with a hammer.

The inventive tubular strainmeter is adapted to be installed with a portable electric tool mounted on the rear portion of the strainmeter, so that it can be quickly installed at various places (including slopes) where no electricity is available or no favorable staging ground is available.

BRIEF DESCRIPTION OF THE DRAWINGS

Preferred embodiments (Embodiments 1 and 2) of the invention will now be described in detail by way of example with reference to FIGS. 1 through 10.

FIG. 4(a)-(b) are cross sections of the tubular strainmeter taken along line A-A' of FIG. 3, when two strain gauges are circumferentially arranged (FIG. 4(a)) and when four strain gauges are circumferentially arranged (FIG. 4(b)).

FIG. 8(a) shows the tubular strainmeter before it is installed; FIG. 8(b) shows a process of mounting pressure receiving plates on the body of the strainmeter; and FIG. 8(c) shows the tubular strainmeter installed in the ground.

DETAILED DESCRIPTION OF THE INVENTION

Figure 1:
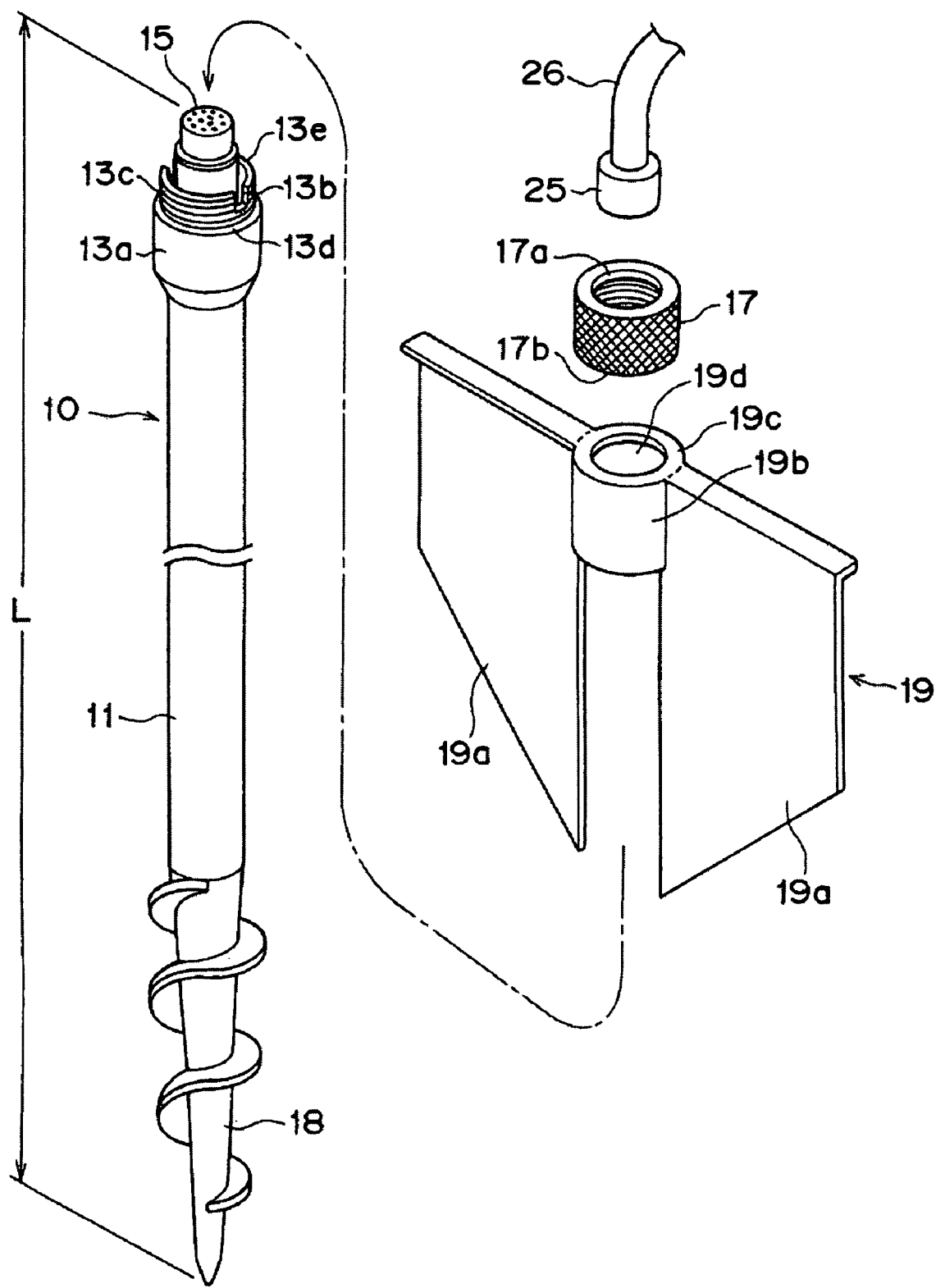
FIG. 1 is an exploded perspective of a penetration-type tubular strainmeter in accordance with Embodiment 1.
Figure 2:
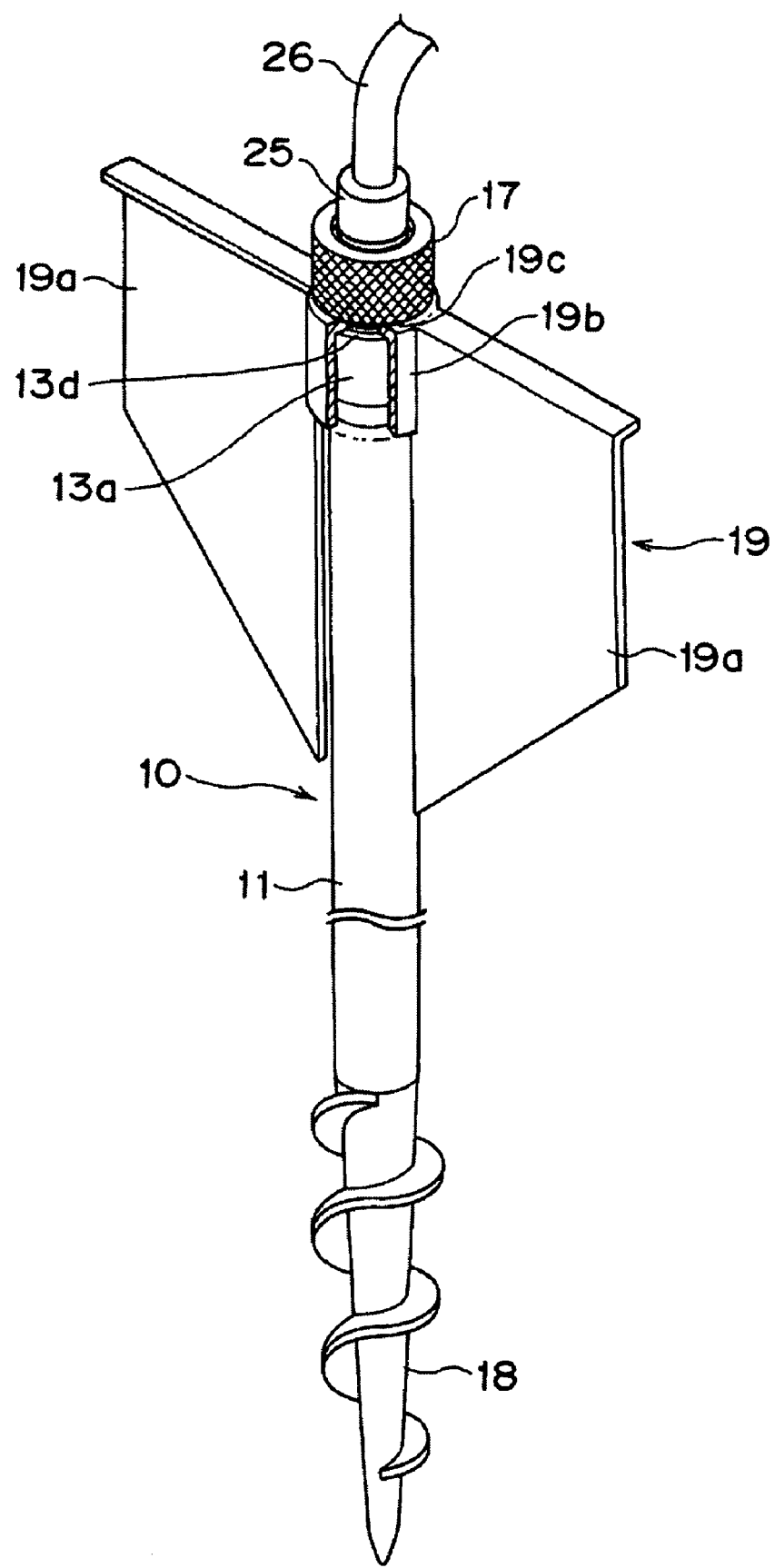
FIG. 2 is a partly cutaway perspective of the tubular strainmeter equipped with pressure receiving plates.

As shown in FIG. 8(c), a tubular strainmeter 10 in accordance with a first embodiment (Embodiment 1) is penetrated in the ground when in use. The tubular strainmeter 10 has a multiplicity of strain gauges 27, which are stuck inside the body 11 of the tubular strainmeter and spaced apart at equal intervals in the axial direction of the tubular strainmeter. The strain gauges can detect a ground strain caused by, for example, a landslide, and output an electric signal indicative of the strain detected. The electric signal generated by the strain gauges 27 is sent to a measuring instrument 24 on the ground via a connecting cable 26 and read by the instrument 24.

Figure 3:
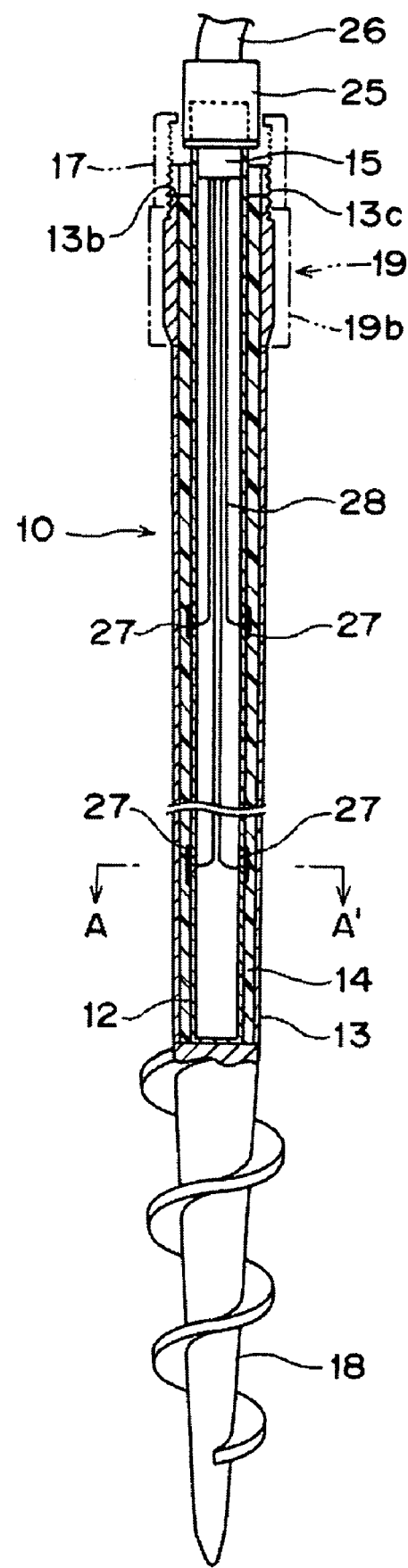
FIG. 3 is a partial axial-cross section of the body of the tubular strainmeter, showing the internal structure of the strainmeter.
Figure 5:
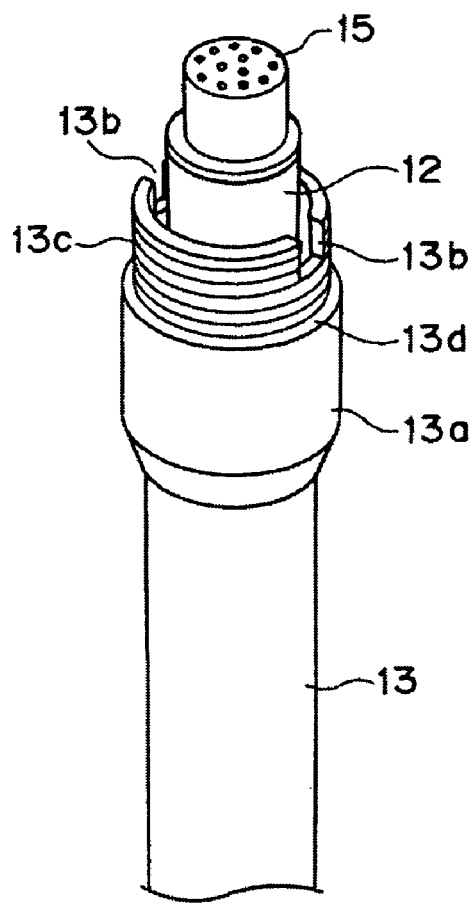
FIG. 5 is an enlarged perspective of the rear end portion of the tubular strainmeter.

Referring again to FIGS. 1 through 5, the structure of the tubular strainmeter 10 will be described in more detail. The strainmeter has a body 11, a drilling screw 18 provided on the leading end of the strainmeter, and slits 13b formed in the rear end of the strainmeter for receiving a rotating tool. As shown in FIG. 3, the body 11 comprises a cylindrical inner tube 12 that is mounted, on the outer surface thereof, with a multiplicity of strain gauges 27 spaced apart at equal intervals in the axial direction (e.g. located at 4 axial positions), and is covered with a concentric outer tube 13. The inner and outer tubes 12 and 13, respectively, are integrally bonded to each other with a solidified epoxy resin 14 filling the gap between them. The slits 13b are formed in the rear end periphery of the opening 13e of the outer tube 13, to thereby receive therein a rotating tool for rotating the whole tubular strainmeter 10.

Lead wires 28 connected to the respective strain gauges 27 enter the inner tube 12 via holes (not shown) formed in the inner tube 12 and extend therein to the female connector 15 fixed at the rear end of the inner tube 12. The female connector 15 closes the rear opening of the inner tube 12, and protrudes from the rear opening 13e of the outer tube 13.

In the example shown herein two strain gauges 27, are stuck on the outer surface of the inner tube 12 to face each other across the inner tube 12 (i.e. spaced apart at equal circumferential intervals), as shown in FIG. 4(a). In this case, the circumferential positions of the strain gauges 27 on the inner tube 12 may be identified by ticking off certain marks on the peripheral edge of the rear opening 13e of the outer tube 13. Alternatively, in place of ticking off marks, circumferential positions of the strain gauges 27 may be aligned with the position of the slits 13b.

The tubular strainmeter 10 is installed in the ground such that the circumferential positions of the two strain gauges 27 (i.e. the line passing through the two strain gauges 27) are aligned with the gradient of the slope of the ground or the direction of an anticipated mudflow (from upstream to downstream). Arranged in this manner, the strain gauges 27 will be subjected to a maximum stress under a landslide and detect the strain with the highest accuracy.

The tubular strainmeter is provided on the rear end of its body 11 (or on the rear end of the outer tube 13) with detachable pressure receiving plates 19. In Embodiment 1, the pressure receiving plates 19 have planar pressure-receiving sections 19a that extend from a central cylindrical section 19b to opposite radial directions. Formed on the upper end of the cylindrical section 19b is an inner flange 19c to form a circular hole 19d. The rear end portion 13a of the outer tube 13 constituting the body 11 of the tubular strainmeter is made thicker than the rest portions of the tube 13. Formed on the outer circumferential surface of the leading end of the outer tube 13 are a male screw 13c and an annular step 13d.

Each of the pressure receiving plates 19 is configured such that the inner flange 19c can be seated on the step 13d of the outer tube 13 when the cylindrical section 19b is fitted on the rear end of the tubular strainmeter 10. The inner flange 19c is firmly fixed between the step 13d and the front edge 17b of a cap 17 having a female thread when the cap 17 is threaded onto the male thread section 13c that projects from the circular hole 19d. When the strainmeter is penetrated in the ground, an earth pressure caused by a ground movement will adequately act on the planar pressure-receiving sections 19a, which pressure in turn acts as a stress on the rear end portion of the body 11 of the tubular strainmeter. It is noted that in order to maximize the load (pressure) applied to the planar pressure-receiving section 19a, pressure receiving plates 19 are mounted on the body 11 in such a way that their planar surfaces, i.e. the pressure receiving sections 19a, are perpendicular to the gradient of the slope, that is, perpendicular to the orientation of the strain gauges 27, as shown in FIGS. 4(a) and 8(b). A male connector 25 at one end of the connecting cable 26, connected at the other end thereof to the measuring instrument 24 (FIG. 8(c)), is connected to the female connector 15 projecting from the circular hole 17a.

It is noted that a tubular strainmeter 10 not equipped with pressure receiving plates 19 can still measure ground strain well, with a little lower detection accuracy in comparison with the one equipped with the pressure receiving plates 19.

Figure 6:
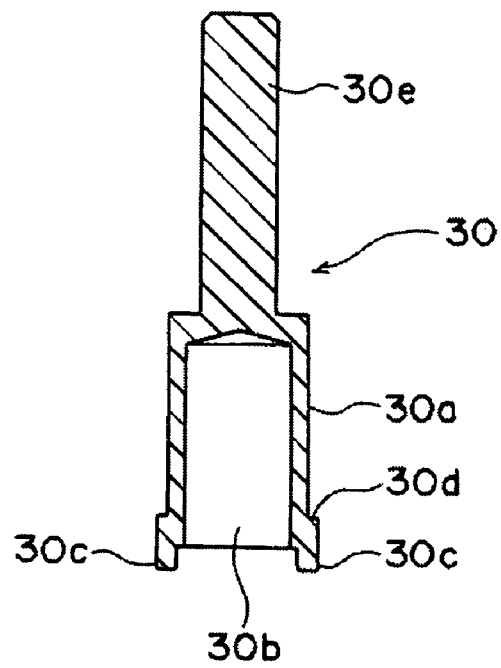
FIG. 6 is an axial cross section of a jig for mounting a rotating tool.
Figure 7:
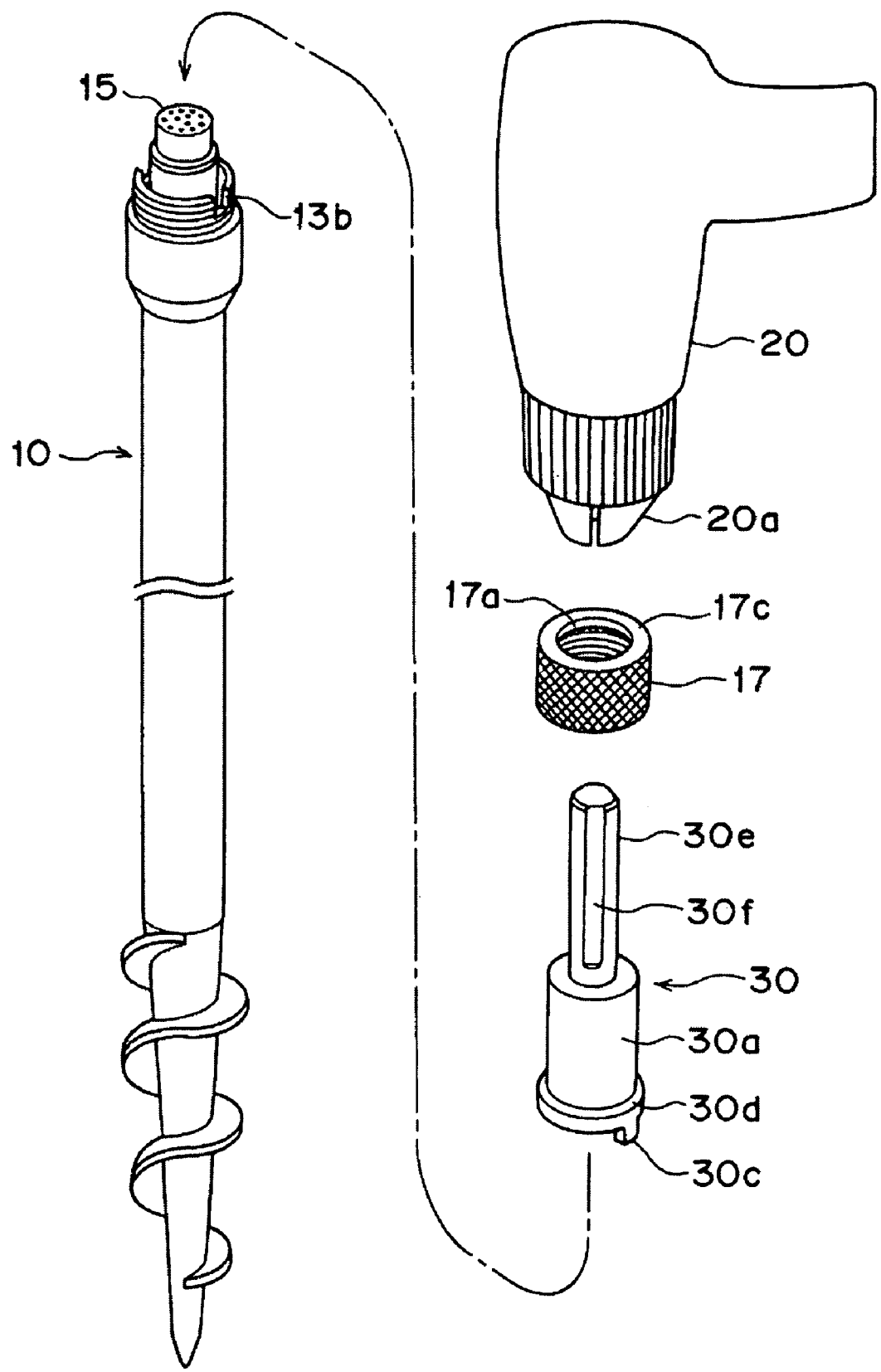
FIG. 7 is an exploded perspective of an electric rotating tool to be mounted on the jig.

Referring to FIGS. 6 and 7, the structure of a jig for connecting a rotating tool 20 with the strainmeter 10 will now be described. FIG. 6 shows a cross section of a metal jig 30 for fixing an electric rotating tool 20 to the rear end of the tubular strainmeter 10. The jig 30 is formed of a thick-cylindrical shaft 30a and a thin cylindrical shaft 30e, coaxially connected to each other as shown. The thick shaft 30a has at the front end (lower end) thereof a cylindrical hole (or opening) 30b that can entirely encompass the female connector 15 at the rear end of the tubular strainmeter 10. Formed at the front end of the thick shaft 30a are pawls 30c that can engage with slits 13b formed in the rear end of the tubular strainmeter 10, and a step 30d to be secured between the rear flange section 17c of the cap 17 and the rear open end 13e (FIG. 1) of the strainmeter 10. The thin shaft 30e is grabbed by the chuck 20a of the rotating tool. The thin shaft 30e is provided on the outer surface thereof with three chamfers 30f spaced at equal circumferential intervals.

The tool fixing jig 30 is placed from above on the female connector 15 formed at the rear end of the tubular strainmeter 10 so as to engage the pawls 30c with the tool mounting slits 13b. Then, the cap 17 is put on the thin shaft 30e and screwed to press, via the step 30d, the jig 30 against the circumferential edge of the rear opening 13e of the strainmeter 10. Finally, the chuck 20a of the electric rotating tool 20 is manipulated to grab the thin shaft 30e that extends from the circular hole 17a.

Figure 8:
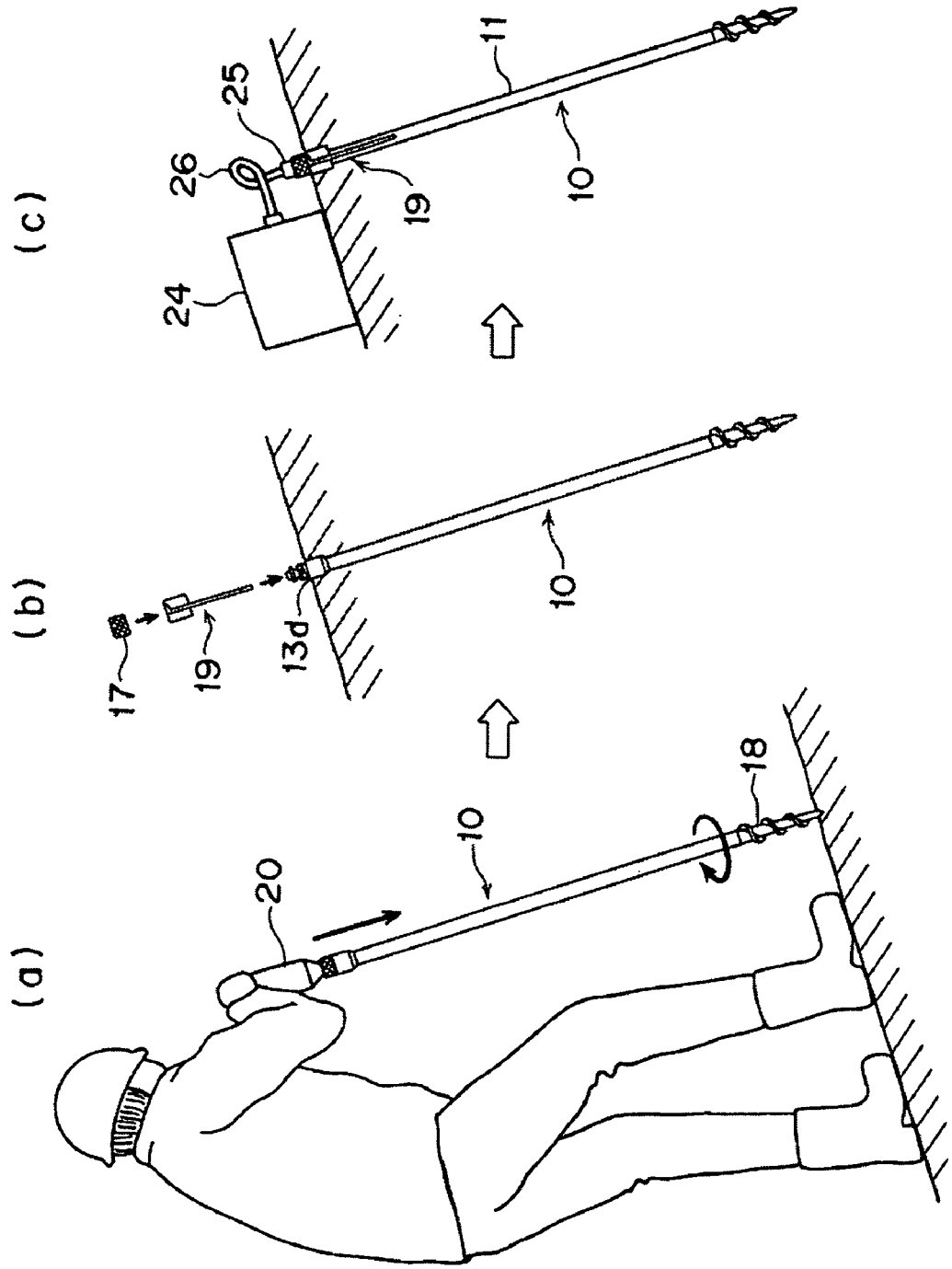
FIG. 8 shows how the penetration-type tubular strainmeter is installed in the ground. More particularly.

Next, referring to FIG. 8, a method of installing the penetration-type tubular strainmeter in the ground in accordance with Embodiment 1 will be described. When, for example, it is necessary to measure the ground strain in a slope where there can be a hazardous landslide, a tubular strainmeter 10 of the invention equipped on the rear end thereof with the electric rotating tool 20 is erected upright on the ground (with the drilling screw 18 placed on the ground), as shown in FIG. 8(a). Then, the strainmeter is screwed into the ground by rotating the tool 20 until the step 13d of its thick rear end portion 13a comes to almost the same level as the ground surface, as shown in FIG. 8(b). In installing the strainmeter 10 in the ground, the rotational position of the strainmeter is adjusted so that the circumferential positions of the strain gauges 27 (or the line passing through the strain gauges 27) is aligned with the gradient of the slope.

Then, the electric rotating tool 20 is removed from the rear end portion of the tubular strainmeter 10. The jig 30 is also removed by loosening the cap 17. Subsequently, the cylindrical section 19b of the pressure receiving plates 19 is fitted from above on the male thread section 13c at the rear end of the strainmeter 10, as shown in FIG. 8(b), and then forced into the ground so as to penetrate the acute-angled tips of the planar pressure-receiving sections 19a in the ground by pounding or pushing the pressure receiving plates 19. Then, the rotational positions of the pressure receiving plates 19 are adjusted so that the flat planes of planar pressure-receiving sections 19a become perpendicular to the gradient of the slope (or perpendicular to the line passing through the strain gauges 27). The pressure receiving plates 19 are securely fixed by screwing the cap 17.

Finally, the connecting cable 26 having the male connector 25 and extending from the measuring instrument 24 near the penetrated tubular strainmeter 10 in the ground is connected to the female connector 15 provided at the rear end of the strainmeter 10, as shown in FIG. 8(c), thereby enabling measurement of the ground strain by the measuring instrument 24.

It is noted that the total length L of the tubular strainmeter 10 (L being the length from the tip of the screw 18 to the female connector 15 at the rear end) is shorter than the shoulder height of an average adult to make it easy for a worker to carry the strainmeter 10, mount the tool 20 on the rear end of the strainmeter, and penetrate the strainmeter 10 in the ground. For this reason, the total length L is preferably in the range from 60 centimeters (cm) to about 1 meter (m). Dimensions of the strainmeter may be conveniently chosen. For example, for a tubular strainmeter having a total length of about 1 m, a preferred length of the drilling screw is about 10 cm, a preferred diameter of the outer tube 13 (except for the thick rear end portion) is about 15 millimeters (mm). The width of the pressure receiving plates 19 (as measured in the diametrical direction of the tubular strainmeter) is about 15 cm, while their heights (as measured in the longitudinal direction of the tubular strainmeter) is about 10 cm.

The inner tube 12, outer tube 13, and drilling screw 18 are preferably made of a metal such as a stainless steel having sufficient rigidity not to yield to the torque (as large as 140 Newtonmeters (Nm) or so when a 12-Volt electric drill or an electric driver is used) applied thereto by the electric rotating tool and undergo a plastic deformation when driving them into the ground. On the other hand, from the point of reducing the weight of the tubular strainmeter, use of appropriate plastics and/or resin materials such as high-strength polymers having sufficient rigidity deserves consideration. For example, the inner tube 12 may be made of an appropriate resin material while the outer tube 13 is made of a highly rigid and non-corrosive metal, thereby simultaneously achieving sufficient rigidity, non-corrosiveness, and a light weight of the tubular strainmeter.

The thick rear portion 13a may be integrally formed with the outer tube 13. Alternatively, it may be fabricated from a separate member having tool mounting slits 13b and then integrally welded to the rear end of the outer tube 13.

The drilling screw 18 may be fabricated from a solid rod and integrally jointed (by welding for example) to the open front end of the outer tube 13. The leading end of the inner tube 12 is closed (by filling and solidifying an epoxy resin for example) before the drilling screw is jointed to the outer tube 13.

The pressure receiving plates 19 are preferably made of a material having sufficient rigidity and strength to withstand pushing and hammering during installation of the plates. The material is also preferred to have corrosive resistance because they are buried. A sufficiently rigid plastic material, such as a polymer material, may be also used.

Four or more planar pressure-receiving sections 19$a$ can be provided equally well on the cylindrical section 19$b$ to extend therefrom radially outwardly, and spaced apart at equal circumferential intervals. By doing so, the rear end of the tubular strainmeter 10 is fixed more firmly in the ground. In addition, the accuracy of the measurement of the ground strain is improved due to the fact that the pressure receiving sections 19$a$ can receive more fully the load of a ground strain if the planar surfaces of the pressure receiving sections 19$a$ are not exactly perpendicular to the gradient of the slope.

In the embodiments shown herein, there are four strain gauges 27 stuck at four different axial (or longitudinal) positions on the outer surface of the inner tube 12 (only two of them shown in FIG. 3), though at least one strain gauge 27 needs be stuck in the axial direction.

Although it is shown that two strain gauges 27 are stuck on the inner tube 12 and at two opposing circumferential positions in Embodiment 1 (FIG. 4($a$)), four strain gauges may be stuck at four, equally spaced, circumferential positions of the inner tube 12, as shown in FIG. 4($b$). In this case, if two facing strain gauges 27 are not aligned with the gradient of the slope, i.e. if the lines passing through two facing strain gauges are not aligned with the gradient, the ground strain can be accurately determined from the differential strains of two gauges 27 arranged across the inner tube 12. Hence, orientations of the strain gauges 27 can be advantageously chosen rather arbitrarily at the time of installation. It would be understood that the number of the strain gauges 27 to be circumferentially stuck on the inner tube 12 at equal intervals can be increased to 6, 8, or more. Odd number of strain gauges 27 (e.g. 3 gauges) can be also arranged at equal intervals.

Figure 9:
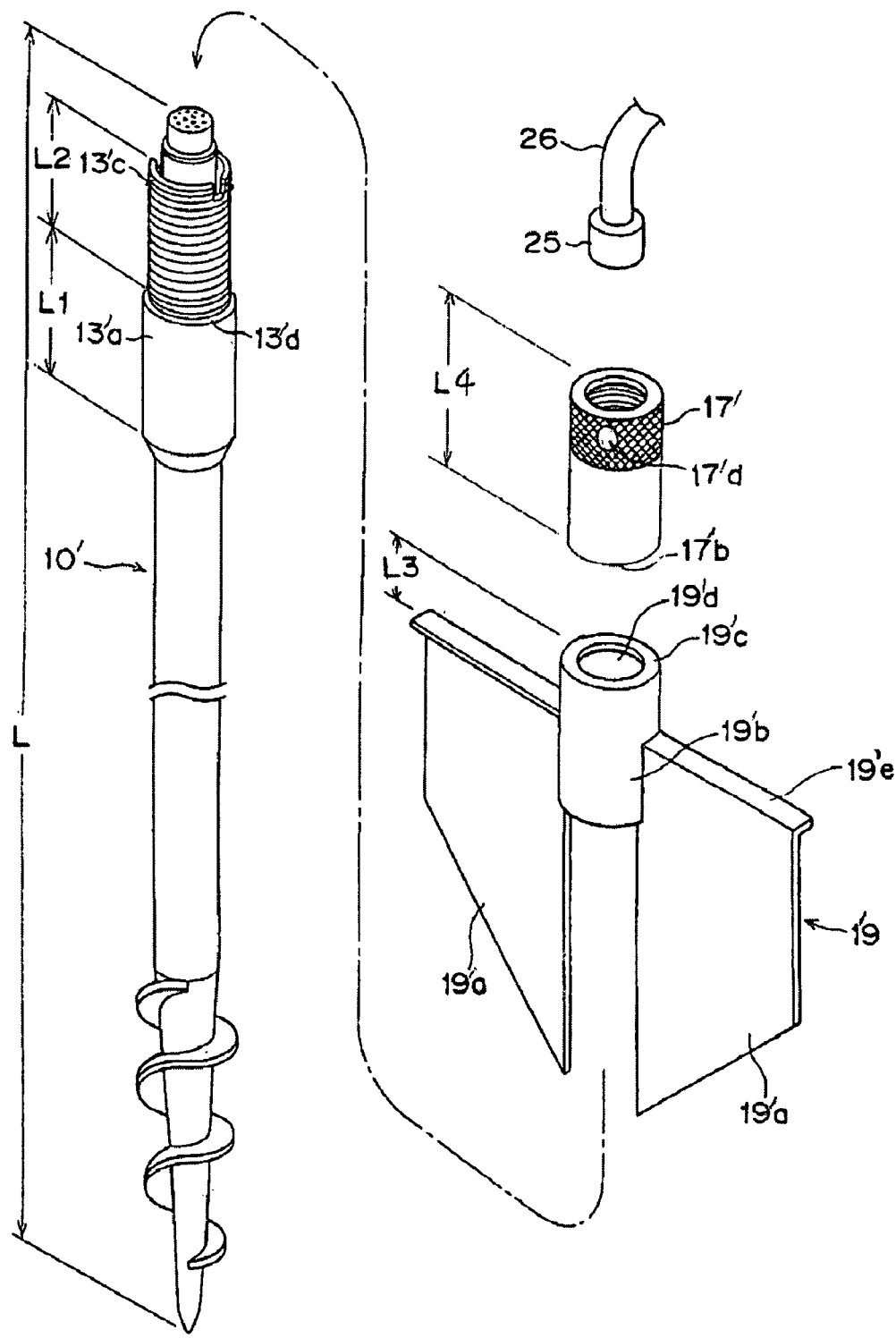
FIG. 9 is an exploded perspective of a penetration-type tubular strainmeter in accordance with Embodiment 2.

Referring to FIG. 9, a further penetration-type tubular strainmeter 10' in accordance with Embodiment 2 will now be described. The tubular strainmeter 10' has a thick rear end portion 13'$a$ of a length of L1 and a male thread section 13'$c$ of a length of L2, which are longer than the lengths of the corresponding portion and section of Embodiment 1 shown in FIG. 1. The cylindrical section 19'$b$ of pressure receiving plates 19' has an inner flange section 19'$c$ that forms a round hole 19'$d$. The inner flange section 19'$c$ protrudes rearward from the bent portions 19'$e$ by a length of L3. A cap 17' has at least one tool insertion hole 17'$d$ for receiving therein a rod-shaped tool. The cap 17' has a length of L4 slightly longer than the length of L2 of the male thread section 13'$c$.

The tubular strainmeter 10' is penetrated in the ground until the thick rear end portion 13'$a$ is exposed in the air by a length equal to the protruding length L3 of the cylindrical section 19'$b$. As a consequence, the planar pressure-receiving sections 19'$a$ are buried in the ground, but the inner flange 19'$c$, supported by the step 13'$d$, remains at the level of L3 above the ground surface. Thus, the lower end of the female thread section is located at a level of L3 above the ground, so that dirt is less likely to enter the female thread section. On the other hand, in installing the pressure receiving plates 19', acutely angled tips of the respective planar pressure-receiving sections 19'$a$ are inserted to a certain depth of the ground by striking or pushing the bent portion 19'$e$ in the same manner as in Embodiment 1 until the rear end portion of the thread section 13'$c$ protrudes from the circular hole 19'$d$ sufficiently to allow the cap 17' to be screwed on the thread section 13'$c$. Then, a rod-like tool (e.g. a hexagonal wrench) is inserted in the tool insertion hole 17'$d$ (configured to receive the hexagonal wrench for example) and levered to rotate the cap 17'.

Since the front end 17'$b$ of the cap 17' pushes the inner flange section 19'$c$ in response to the torque applied to the cap, the planar pressure-receiving sections 19'$a$, partly exposed in the air, can be further penetrated in the ground by a length of L2 equal to the length of the male thread section 13'$c$. By forming a tool insertion hole 17'$d$ in the cap 17' in this way, the remaining exposed portions of the planar pressure-receiving sections 19'$a$ can be easily penetrated in the ground by screwing the cap 17' even when a large force is otherwise needed to penetrate the exposed portion. In place of the tool insertion hole 17'$d$, the cap 17' may be provided with a quadrangular or hexagonal outer surface to thereby rotate the cap 17' with a spanner for example.

Figure 10:
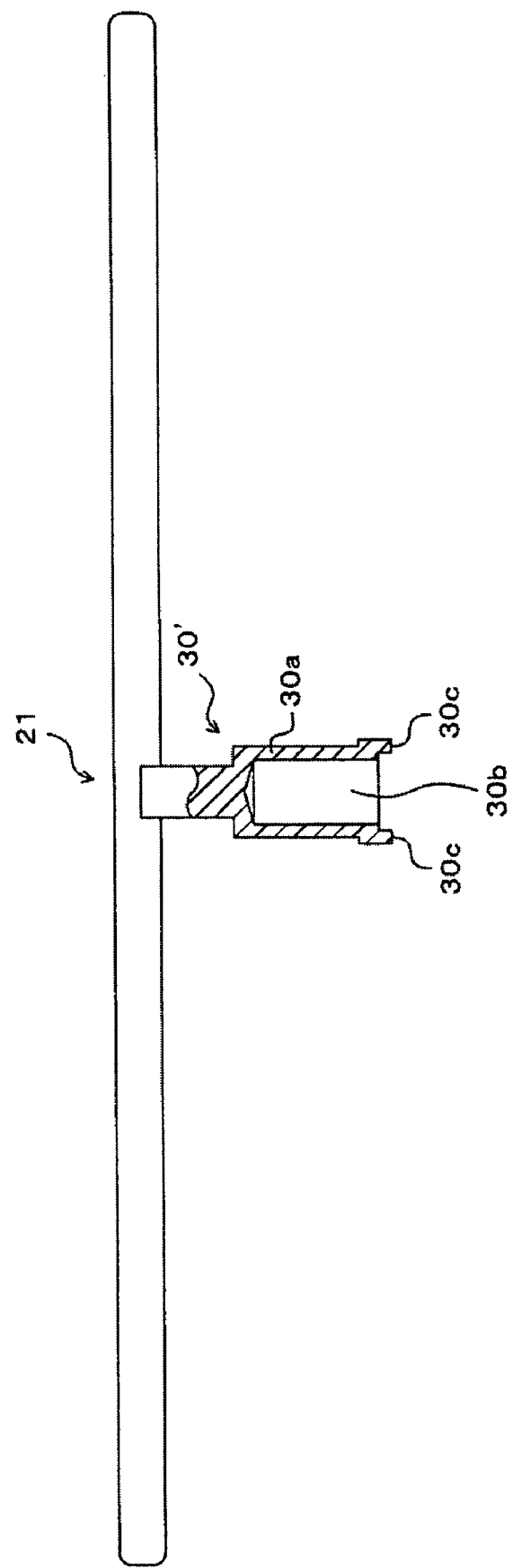
FIG. 10 is a perspective of a T-shaped manual rotating tool 21.
Figure 11:
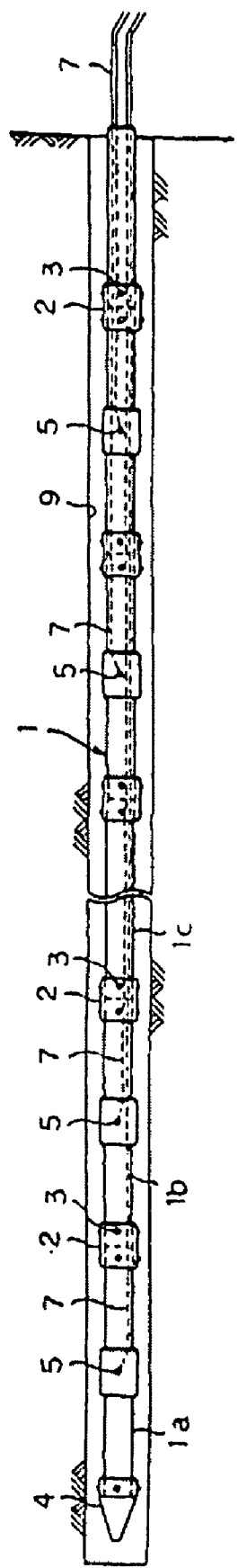
FIG. 11 is a front elevation of a conventional tubular strainmeter installed in the ground.

In penetrating the tubular strainmeter, a T-shaped manual rotating tool 21 having a jig 30' (FIG. 10) may be used in place of the electric rotating tool 20.

As shown and described above, the penetration-type tubular strainmeter of the invention can be conveniently installed at various places in a simple manner at low cost. Thus, by installing the tubular strainmeters quickly in those places where hazardous landslides are anticipated, analyses and assessments of soil deformation phenomena from a precursory landslide to a ground collapse are made possible. Therefore, the invention is highly significant in this regard.

What is claimed is:

1. A penetration-type tubular strainmeter for measuring a ground strain, the tubular strainmeter comprising:
    a body having a double-tube structure comprising an inner tube housed in an outer tube, the inner tube including, on an outer surface thereof, at least two strain gauges;
    a drilling screw mounted on a leading end of the body;
    a tool mount provided at a rear end of the body for attaching thereto a tool for rotating the body; and
    at least two radially extending detachable pressure receiving plates that are circumferentially spaced apart at equal intervals at the rear end portion of the body, the detachable pressure receiving plates being structured to be mounted at a rear end of the body after the penetration-type tubular strainmeter has been installed into the ground.

2. The penetration-type tubular strainmeter according to claim 1, wherein each tip of the pressure receiving plates is acutely angled.

3. The penetration-type tubular strainmeter according to claim 1, wherein the tool for rotating the body is a portable electric tool.

* * * * *